(12) United States Patent
Dobeck et al.

(10) Patent No.: US 7,577,516 B2
(45) Date of Patent: Aug. 18, 2009

(54) POWER MANAGEMENT APPARATUS AND METHODS FOR PORTABLE DATA TERMINALS

(75) Inventors: Brian R. Dobeck, Matthews, NC (US); Adam E. Meggitt, Charlotte, NC (US); Jim T. Sauerwein, Charlotte, NC (US); Daniel Duane Yeakley, Monroe, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 11/382,394

(22) Filed: May 9, 2006

(65) Prior Publication Data

US 2007/0276583 A1  Nov. 29, 2007

(51) Int. Cl.
*G01C 21/00* (2006.01)
(52) U.S. Cl. .................. 701/200; 701/213; 342/357.09
(58) Field of Classification Search ................. 701/200, 701/213; 342/357.09, 357.06
See application file for complete search history.

(56) References Cited

U.S. PATENT DOCUMENTS

| | | | |
|---|---|---|---|
| 4,973,952 A | 11/1990 | Malec et al. | |
| 5,239,669 A | 8/1993 | Mason et al. | |
| 5,406,491 A | 4/1995 | Lima | |
| 5,565,858 A | 10/1996 | Guthrie | |
| 5,592,173 A * | 1/1997 | Lau et al. ............... 342/357.12 | |
| 5,596,652 A | 1/1997 | Piatek et al. | |
| 5,648,770 A | 7/1997 | Ross | |
| 5,699,244 A | 12/1997 | Clark, Jr. et al. | |
| 5,710,728 A | 1/1998 | Danielson et al. | |
| 5,828,322 A | 10/1998 | Eberhard et al. | |
| 5,873,070 A | 2/1999 | Bunte et al. | |
| 5,902,347 A | 5/1999 | Backman et al. | |
| 5,910,799 A | 6/1999 | Carpenter et al. | |
| 5,938,721 A | 8/1999 | Dussell et al. | |
| 5,977,908 A | 11/1999 | Nichols | |
| 6,067,045 A | 5/2000 | Castelloe et al. | |
| 6,067,046 A | 5/2000 | Nichols | |
| 6,078,251 A | 6/2000 | Landt et al. | |
| 6,101,483 A | 8/2000 | Petrovich et al. | |
| 6,132,391 A | 10/2000 | Onari et al. | |
| 6,142,372 A | 11/2000 | Wright | |
| 6,144,976 A | 11/2000 | Silva et al. | |
| 6,199,044 B1 | 3/2001 | Ackley et al. | |
| 6,201,498 B1 | 3/2001 | Fan | |
| 6,226,622 B1 | 5/2001 | Dabbiere | |
| 6,311,896 B1 | 11/2001 | Mulla et al. | |
| 6,394,354 B1 | 5/2002 | Wilz, Sr. et al. | |
| 6,411,891 B1 | 6/2002 | Jones et al. | |
| 6,411,899 B2 | 6/2002 | Dussell et al. | |

(Continued)

*Primary Examiner*—Mark Hellner
(74) *Attorney, Agent, or Firm*—Marjama Muldoon Blasiak & Sullivan LLP

(57) ABSTRACT

In accordance with at least one embodiment, a portable data terminal generally comprising a battery: a central controller, a GPS system, and an auxiliary processor. The central controller that has a sleep state wherein at least some of the functionality of the central controller is limited to conserve battery power. The auxiliary processor may be selected based, at least in part, on power draw. In particular, it is desirable for the auxiliary processor to use less power than the central controller when the central controller is fully activated. The auxiliary processor monitors the output of the GPS system and wakes the central controller from a sleep state based on the output of the GPS system.

39 Claims, 5 Drawing Sheets

U.S. PATENT DOCUMENTS

| | | | |
|---|---|---|---|
| 6,422,466 B1 | 7/2002 | Dickson et al. | |
| 6,433,732 B1 | 8/2002 | Dutta et al. | |
| 6,456,938 B1 | 9/2002 | Barnard | |
| 6,496,775 B2 | 12/2002 | McDonald, Jr. et al. | |
| 6,510,376 B2 | 1/2003 | Burnstein et al. | |
| 6,532,152 B1 | 3/2003 | White et al. | |
| 6,535,199 B1 | 3/2003 | Canova, Jr. et al. | |
| 6,556,553 B1 | 4/2003 | Palmer et al. | |
| 6,614,392 B2 | 9/2003 | Howard | |
| 6,629,642 B1 | 10/2003 | Swartz et al. | |
| 6,693,586 B1 | 2/2004 | Walters et al. | |
| 6,694,146 B1 * | 2/2004 | Hardin et al. | 455/515 |
| 6,701,231 B1 | 3/2004 | Borugian | |
| 6,701,234 B1 | 3/2004 | Vogelsang | |
| 6,747,692 B2 | 6/2004 | Patel et al. | |
| 6,748,320 B2 | 6/2004 | Jones | |
| 6,798,378 B1 | 9/2004 | Walters | |
| 6,804,606 B2 | 10/2004 | Jones | |
| 6,816,112 B1 | 11/2004 | Chethik | |
| 6,837,436 B2 | 1/2005 | Swartz et al. | |
| 6,844,846 B1 | 1/2005 | Riday | |
| 6,889,139 B2 | 5/2005 | Prabhakaran | |
| 6,937,985 B2 | 8/2005 | Kuma et al. | |
| 7,003,316 B1 | 2/2006 | Elias et al. | |
| 7,016,899 B1 | 3/2006 | Stern et al. | |
| 7,026,984 B1 * | 4/2006 | Thandu et al. | 342/357.09 |
| 7,034,747 B1 | 4/2006 | Walters et al. | |
| 7,040,541 B2 | 5/2006 | Swartz et al. | |
| 7,092,009 B2 | 8/2006 | Patel et al. | |
| 7,118,032 B2 | 10/2006 | Elliot et al. | |
| 7,120,462 B2 | 10/2006 | Kumar | |
| 7,147,163 B2 | 12/2006 | Salvato et al. | |
| 7,155,405 B2 | 12/2006 | Petrovich | |
| 7,180,427 B2 | 2/2007 | Meyer et al. | |
| 7,184,972 B2 | 2/2007 | Flaherty | |
| 7,198,192 B2 | 4/2007 | Page et al. | |
| 2003/0046451 A1 * | 3/2003 | Prabhakaran | 710/1 |
| 2004/0203571 A1 * | 10/2004 | Hashizume | 455/404.1 |
| 2004/0252053 A1 * | 12/2004 | Harvey | 342/357.15 |
| 2006/0030338 A1 | 2/2006 | Harken et al. | |
| 2006/0256005 A1 * | 11/2006 | Thandu et al. | 342/357.06 |

* cited by examiner

POWER MANAGEMENT APPARATUS AND METHODS FOR PORTABLE DATA TERMINALS

BACKGROUND OF THE INVENTION

Portable data terminals (PDTs) are a type of data collection devices used to collect, interpret, process, and ultimately transfer data to a larger data processing system. PDTs generally integrate a mobile computer, an alpha-numeric or numeric keypad, and at least one data acquisition device. The mobile computer portion is generally similar to known touch screen consumer oriented portable computing devices (e.g. "Pocket PCs" or "PDAs"), such as those available from PALM, HEWLETT PACKARD, and DELL. The data acquisition device generally comprises a device that captures data from an encoded source, for example, radio frequency IDs (RFID), images, and bar codes. Data may also be captured via keypad entry and utilization of a touch pad associated with the mobile computer. In addition to the integration of a data acquisition device and keypads, PDTs distinguish from consumer oriented portable computing devices through the integration of more durable or "industrial" versions of their constituent components. Additionally, PDTs tend to provide improved power performance by utilizing superior batteries and power management circuits. PDTs are available from several sources. including the assignee of the present application: HAND HELD PRODUCTS. INC.

FIG. 1 is a plan view of a known PDT 100. The PDT 100 utilizes an elongated water resistant body 102 supporting a variety of components, including: a battery (not illustrated); a touch screen 106 (generally comprising a LCD screen under a touch sensitive panel); a keypad 108 (including a scan button 108a); a scan engine 110 (not illustrated); and a data/charging port 112 (also not illustrated). The scan engine 110 may comprise, for example, an image engine, a laser engine or and RFID engine. The data/charging port 112 typically comprises a proprietary mechanical interface with one set of pins or pads for the transmitting and receiving data (typically via a serial interface standard such as USB or RS-232) and a second set of pins or pads for receiving power for operating the system and/or charging the battery.

In use, the user may actuate the scan key 108a to initiate data capture via the scan engine 110. The captured data is analyzed, e.g. decoded, to identify the information represented. The decoded data is stored and possibly displayed on the PDT 100. Additional processing of the data may take place on the PDT 100 and/or a data processing resource to which the data is transmitted via any available transport mechanism on the PDT 100. Some examples of known transport mechanisms utilized by PDT's include: Bluetooth, WiFi, GSM, CDMA, USB, IrDA, removable FLASH memory, parallel, and serial (including for example, RS-232).

FIG. 2 is a block diagram of a known PDT 200. A central processing unit (CPU) 202 receives data from and outputs data to other sub-systems for storage, transmission and additional processing. The CPU 202 typically comprises one or more of a number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 202 is controlled by software or firmware (typically referred to as an operating system) stored in one or more memory locations 205n, including RAM 205a and FLASH memory 205b. Examples of suitable operating systems for the PDT 200 include graphical user interfaces such as WINDOWS MOBILE, WINDOWS CE, WINDOWS XP, LINUX, PALM, and OSX.

In general, communication to and from the CPU 202 and among the various sub-components takes place via one or more ports or busses, including a main system bus 204; a plurality of Universal Asynchronous Receiver/Transmitter (UART) ports 206n; and a Dual Universal Asynchronous Receiver/Transmitter (DUART) 210.

A variety of secondary processors may be provided to perform general and application specific functions. The example illustrated in FIG. 2 provides three such processors: a field programmable gate array (FPGA) 212; an auxiliary processor 214; and an LCD controller 216. The FPGA 212 may comprise any number of FPGAs including the Virtex-4 family of FPGAs available from XILINX. The FPGA 212 is used to interface with certain data acquisition system as described hereinafter. The auxiliary processor 214 may comprise any number of embedded (or general purpose) processors, including the PICmicro® family of microcontrollers available from MICROCHIP TECHNOLOGY. The auxiliary processor 214 interfaces with and controls a variety of data input devices including, for example a touch sensitive panel 222, a keypad 224, and a scan key or trigger 226. The LCD controller 216 may comprise any number of available controllers including for example, one of the available EPSON LCD controllers. As its name and connections suggest, the LCD controller 216 controls the display of images on an LCD display 220, such as any number of displays available from SHARP. The combination of the LCD 220 and the touch sensitive panel 222 is often referred to as a "touch screen."

The PDT 200 may further include a plurality of communication links such as an 802.11 communication link 240, an IR communication link 242, a Bluetooth communication link 244, and a cellular communication link 246 for communication with a cellular network such as a network in accordance with the Global System for Mobile Communications (GSM). The 802.11 communication link 240 interfaces with the CPU 202 via the main system bus. The IR communication link 242, and Bluetooth communication link 244 are connected to the CPU 202 via UART channels 206n. The cellular communication link 246 is connected to the CPU 202 via the DUART 210. Wired communication may be conducted via a UART, such as the UART 206e. Each of the communication links facilitates communication with a remote device and is principally used to transfer and receive data.

In use, the PDT 200 may be configured to activate a data acquisition system based on the actuation of a key on the keypad 224 (including the Trigger 226) or a touch on the touch panel 222. A variety of suitable data collection systems are available for integration into the PDT 200. In the example shown in FIG. 2, two such systems are illustrated: an image signal generation system 250 and an RFID reader unit 260. One or more of the data acquisition systems may be administered by the FPGA 212. In the illustrated case, the FPGA 212 initiates operation of the image generation system 250 and accumulates data received there from prior to depositing such data in memory 205n. Possible configurations of the FPGA 212 are illustrated in U.S. Pat. No. 6,947,612 incorporated herein by reference. Communication with, and control of, the RFID reader unit 260 is via the system bus 208.

The image signal generating system 250 generally comprises a two dimensional solid state image sensor 252, available in such technologies as CCD, CMOS, and CID, for capturing an image containing data, e.g. an, image, a bar code or a signature. Two-dimensional solid state image sensors generally have a plurality of photo sensor picture elements ("pixels") which are formed in a pattern including a plurality of rows and a plurality of columns of pixels. The image signal generating system 250 further includes an imaging optics (not shown) focusing an image onto an active surface of the image sensor 252. Image sensor 252 may be incorporated on an image sensor IC chip having disposed thereon image sensor control circuitry, image signal conditioning circuitry, and an analog-to-digital converter. FPGA 212 manages the capture and transfer of image data into memory 205n. Decoding may be performed by the CPU 202 or any suitable secondary processor. Examples of suitable image signal generation system 250 include an IMAGETEAM 5x00VGA/5x00MPX imaging module of the type available from Hand Held Products, assignee of the present application.

One use of the image signal generating system 250 is reading and interpreting bar codes such as bar code 275 on an item 270. In this mode, when trigger button 226 is actuated, the CPU 202 cause the appropriate control signals to be sent to the image sensor 252. In response thereto, the image sensor 252 outputs digital image data including a representation of the bar code symbol 275. This data is acquired by the FPGA 212 where it is collected and subsequently transferred to memory 205n. In accordance with a decoding program (not specifically illustrated) an attempt may be made to decode the bar code represented in the captured digital image representation. The capture and decoding of image data may occur automatically in response to a trigger signal being generated, usually by activation of the trigger 226 or a pre-selected key on keypad 224. For example, the CPU 202 may be configured, typically through execution of a program resident in memory 205n, to continuously capture and decode bar code symbols represented therein until either a successful decode is completed or the trigger 226 is released. The cycle may also be terminated by timing out after a number of unsuccessful decode attempts.

In addition to having a decode mode of operation, the image signal generation system 250 may also be configured for an image capture mode of operation. In an image capture mode of operation, an electronic image representation is captured without attempting a decode. The captured electronic image representation may be one or more of (i) stored into a designated memory location of memory 205n, (ii) transmitted to an external device, or (iii) displayed on LCD 220. This mode may be used to capture, for example an image of a signature or damage to a package.

The RFID reader unit 260 includes an RF oscillation and receiver circuit 262 and a data decoder 264. RFID reader unit 260 may be configured to read RF encoded data from a passive RFID tag, such as tag 277, which may be disposed on article 270. In such a case, RF oscillation and receiver circuit 262 transmits a carrier signal to the passive tag which in turn converts the carrier energy to voltage form and actuates a transponder (not shown) to transmit a radio signal representing the encoded tag data. RF oscillator and receiver circuit 262, in turn, receives the radio signal from the tag and converts the data into a digital format. Data decoder 264, typically including a low cost microcontroller IC chip, decodes the received radio signal information received by RF oscillator and receiver circuit 262 to decode the encoded identification data originally encoded into RFID tag 277.

RFID reader unit 260 may, for example, operate in a selective activation mode or in a continuous read operating mode. In a selective activation mode, RFID reader unit 260 broadcasts radio signals in an attempt to activate a tag or tags in its vicinity in response to an RFID trigger signal being received. In a continuous read mode, the RF oscillation and receiver circuit 262 continuously broadcasts radio signals in an attempt to actuate a tag or tags in proximity with unit automatically, without receiving a trigger signal. PDT 200 may be configured so that the CPU 202 recognizes a trigger signal under numerous conditions, such as: (1) actuation of the trigger 226; (2) receipt of an RFID trigger instruction (for example generated by a software program); or (3) a determination that some other predetermined condition has been satisfied.

There has been interest in integrating global positioning satellite (GPS) systems with portable devices such as PDTs. In a GPS system, a GPS receiver receives a signal from one or more GPS satellites, calculates a location of the receiver from the received signal(s). To calculate a location, the GPS receiver demodulates the signal(s) from the GPS satellite and acquires orbit data for the GPS satellite. Then, from an orbit of the GPS satellite, current time information, and a delay time of a received signal, the GPS receiver derives a three-dimensional location by solving a series of simultaneous equations.

A consumer GPS receiver receives a signal an L1 band from the GPS satellite, namely, a spectrum diffusion signal electric wave referred to as a C/A (Coarse/Acquisition) code and carries out a positioning calculation. In the consumer space, PDAs with integrated GPS systems have been marketed by GARMIN and NAVMAN. The benefits imparted by the combination of a PDA and a GPS revolve around reducing the number of devices a user carries; providing a superior display for use with GPS navigation software; and the ability to integrate location data with data produced by software running on the PDA.

In a PDT, such as PDTs 100 and 200, battery life is a significant differentiator between competing products. Current GPS systems draw an inordinate amount of current and are not typically optimized for power consumption. The present inventors have recognized a need for methods and apparatus to incorporate current GPS systems into PDTs while maintaining the extended battery life that separates PDTs from consumer oriented portable computing devices.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
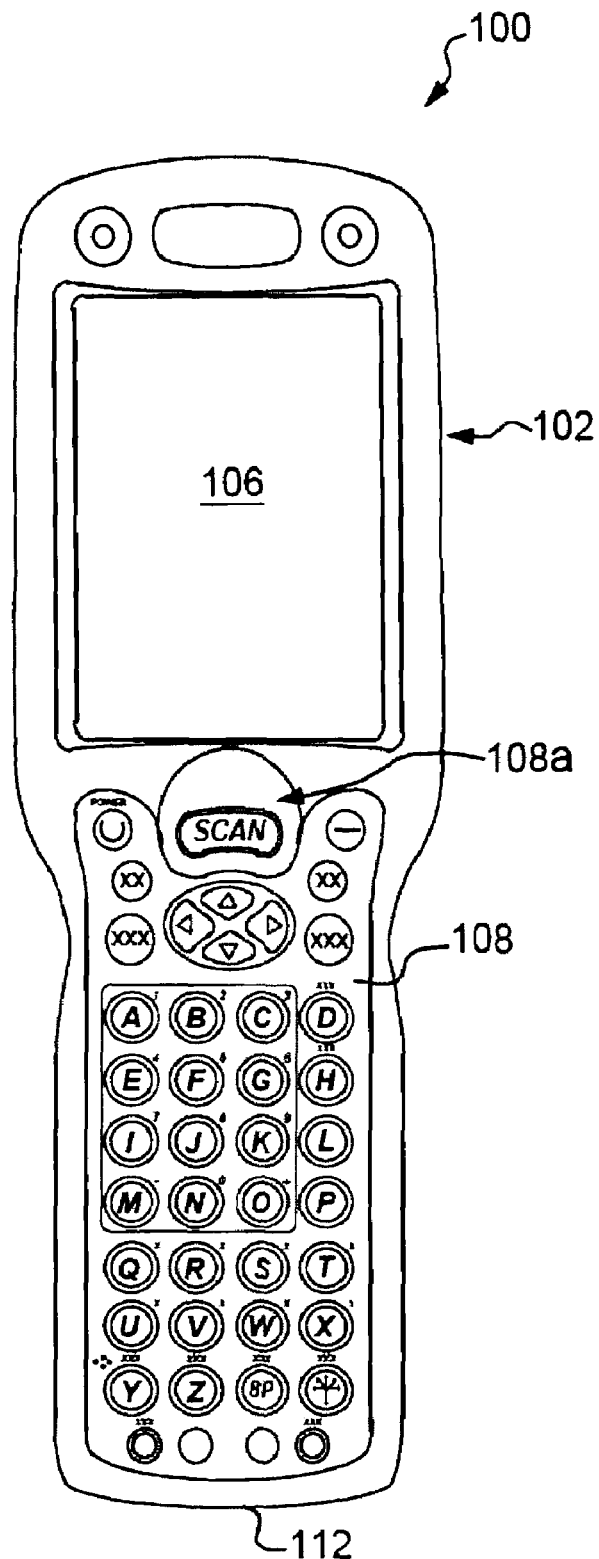
FIG. 1 is a plan view of a known PDT.

Reference will now be made in detail to the present invention, examples of which are illustrated in the accompanying drawings, wherein like reference numerals refer to like elements throughout. It is to be noted that an element number followed by a letter generally indicates multiple occurrences of similar, either in structure or function, elements. Further, the use of an italicized "n" associated with an element number generally denotes either an unspecified instance of such element or a partial or complete grouping of such elements—the meaning of which is to be drawn from the context of such use.

The following description will use nomenclature associated with a PDT, however those of ordinary skill in the art will recognize that the present invention is applicable to a variety of other portable devices including bar code scanners, consumer electronics (including portable computing devices, portable radios, televisions and cell phones), and the like. It is anticipated that a variety of portable devices will benefit from the present invention, including the embodiments thereof described herein.

Figure 3:
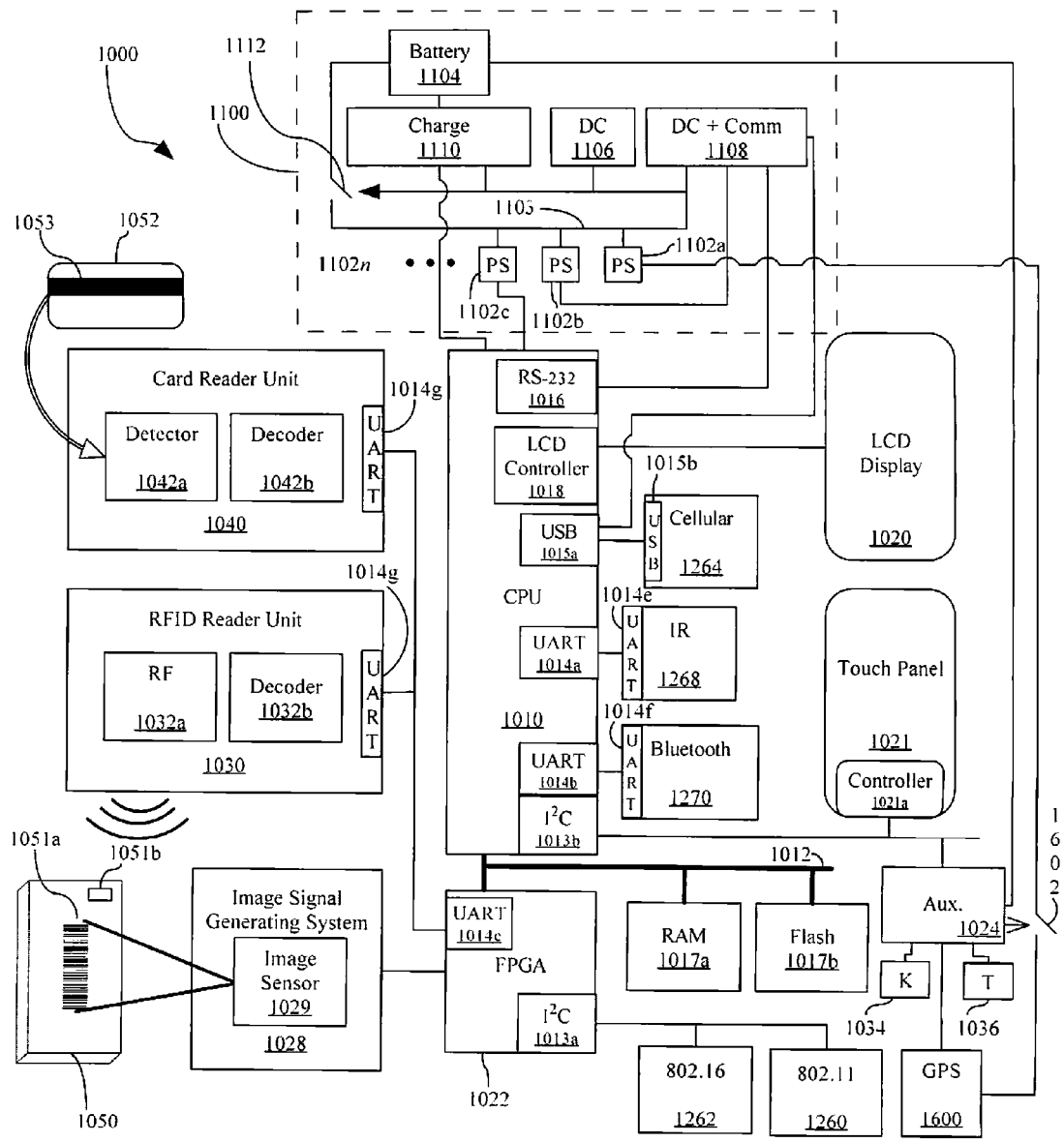
FIG. 3 is a block diagram of a PDT in accordance with an embodiment of the present invention.

FIG. 3 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; any number of RISC processors such as those available from ARM; or any number of custom solutions including pre-configured floating point gate arrays (FPGAs); and application specific integrated circuits (ASICs). Overall operation of the CPU 1010 is controlled by software or firmware, typically referred to as an operating system which may be stored in one or more memory locations 1017n, including RAM 1017a and FLASH memory 1017b. Examples of suitable operating systems for PDT 1000 include SYMBIAN: WINDOWS MOBIL, WINDOWS CE, WINDOWS XP, LINUX, PALM, and OSX.

In general, communication to and from the CPU 1010 and among the various sub-components takes place via one or more ports or busses, including a main system bus 1012, and $I^2C$ busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 also includes an integrated liquid crystal display (LCD) controller 1018 for controlling an LCD 1020. An interface such as a touch sensitive panel 1021 with integrated controller 1021a may be associated with the LCD 1020 for receipt of data thereon. The combination of the LCD 1020 and the touch sensitive panel 1021 is often referred to as a "touch screen." The touch sensitive panel 1021 may be in communication with one or more of the CPU 1010 and an auxiliary processor 1024 via the $I^2C$ bus 1013b.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM) or one that conforms to the CDMA standard, an IR communication link 1268, and a Bluetooth communication link 1270. Each of these links facilitates communication with a remote device and may be used to transfer and receive data. Other possible links include: an 802.15.4 link, a UMTS link, and a HSPDA link.

Figure 2:
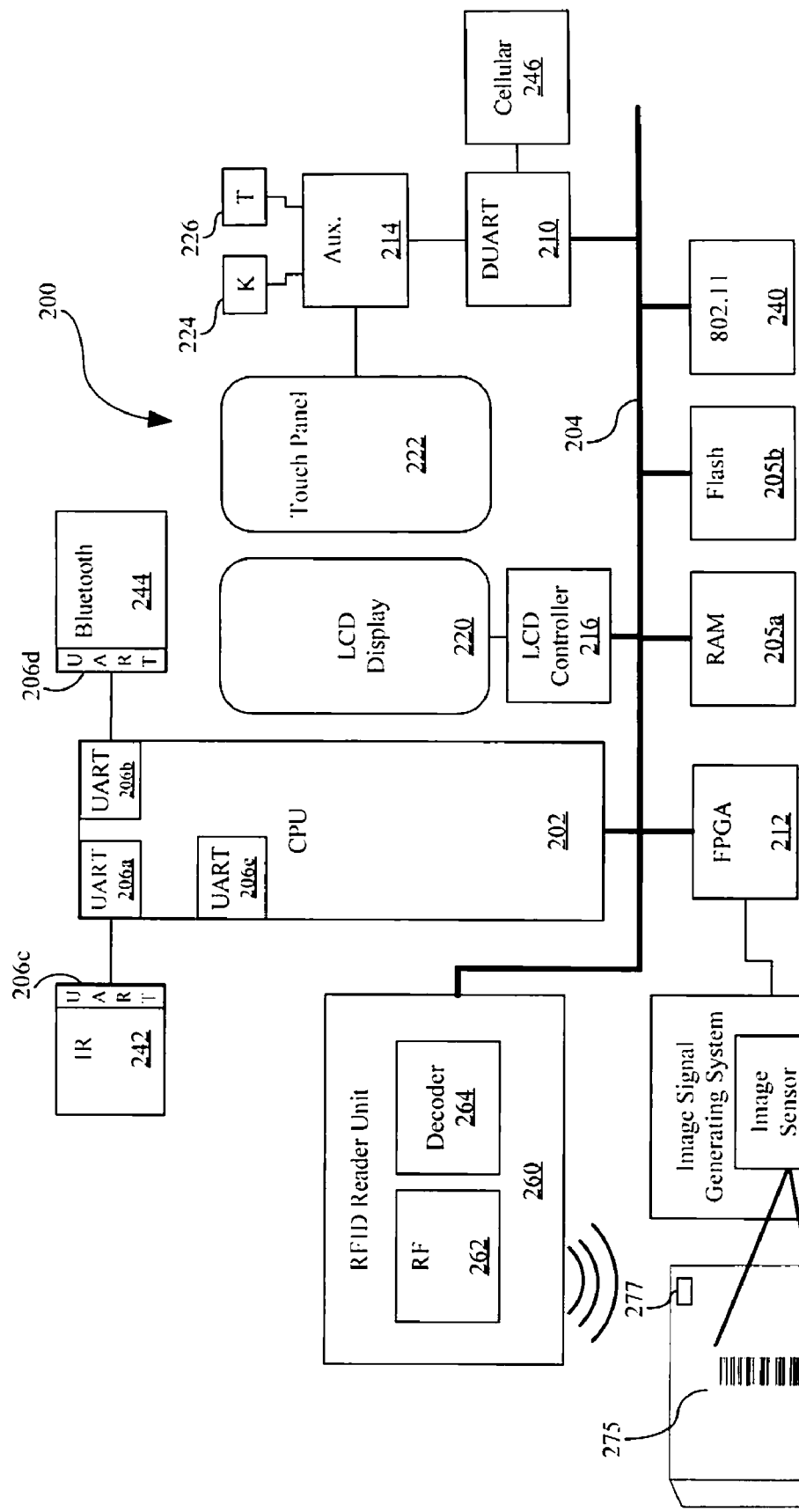
FIG. 2 is a block diagram of a known PDT.

A variety of secondary processors may be provided to perform general and application specific functions. The example illustrated in FIG. 2 provides two such processors: a field programmable gate array (FPGA) 1022 and an auxiliary processor 1024. The FPGA 1022 may comprise any number of FPGAs including the Virtex-4 family of FPGAs available from XILINX. The auxiliary processor 1024 may comprise any number of embedded (or general purpose) processors, including one of the AVR RISC processors available from ATMEL CORPORATION.

The auxiliary processor 1024 may interface with a variety of data input devices including, for example, a keypad 1034 and a trigger 1036. By way of example, the PDT 1000 may be configured so that displayed menu options are selected by physically depressing a key on the keypad 1034 or activating the touch screen 1021 with use of a finger or stylus. The trigger 1036 may be used for initiating and controlling one or more data collection systems, such as an image signal generating system 1028, an RFID sensing system 1030, or a magnetic stripe reader 1040. It is to be noted that while a plurality of data collections systems are shown, it is not unusual for any PDT to be provided with just one such data collection system.

The data collection systems (e.g. the image signal generating system 1028, the RFID sensing system 1030, and the magnetic stripe reader 1050) may be controlled by the FPGA 1022. In this case, the FPGA 1022 initiates and controls the operation of the data collection systems and accumulates data received there from prior to depositing such data in memory 1017n. Possible configurations of FPGA 1022 are illustrated in U.S. Pat. No. 6,947,612 incorporated herein by reference.

As with the image signal generating system 250 illustrated in FIG. 2, the image signal generating system 1028 generally comprises a two dimensional solid state image sensor 1029 useful for imaging bar code 1051a on package 1050. As with the RFID reader unit 260, the RFID reader unit 1030 includes an RF oscillation and receiver circuit 1032a and a data decoder 1032b useful for retrieving information from an RFID tag 1051b on the package 1050. Use models of the image generation signal 1028 and the RFID reader unit 1030 will be similar to those disclosed with respect to FIG. 2.

Still further, the PDT 1000 may include a card reader unit 1040 for reading data from a card 1052. Card reader unit 1040 generally comprises a signal detection circuit 1042a and a data decode circuit 1042b. In operation, the signal detection circuit 1042a detects data, from for example a magnetic strip 1053 on a card 1052. Subsequently, the data decode circuit 1042b decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 is supplied for the controlling supplying of power to the PDT 1000. The power circuit 1100 generally comprises a series of power supplies 1102n that regulate the power supplied to the various components of the PDT 1000. Each power supply 1102n generally comprises a step up or step down circuit connected to each of the various components in the PDT 1000 that require the particular voltage output by that power supply 1102n.

The power supplies receive electricity from a power bus 1103 which is, in turn, supplied by one of a battery 1104, a first power input 1106 or a second power input on the connector 1108. The first power input 1106 may comprise a DC power jack, for example, a 2.5 mm coaxial DC power plug or barrel jack which receives DC current from a conventional AC/DC transformer. The connector 1108 may comprise any number of known connection technologies, such as the D (or sub-D) Series of circular plastic connectors or the HCL D-sub derivative design data transfer connector available from HYPERTRONICS, INC. Certain pins of the connector 1108 may be dedicated to receiving DC power, for example 9.5 volts, while other pins are dedicated to one or more communication paths, e.g. RS-232 and USB. It may also prove advantageous to provide DC power out, for example from a power supply 1102b, so as to power tethered accessories, such as external magnetic stripe or RFID readers (not shown). It may prove further advantageous to add circuitry to insulate the power input 1106 from the connector 1108 and other components in the PDT 1000 in the event that a user attempts to supply power to both power inputs.

The battery 1104 may be selected from any of a variety of battery technologies including fuel cell, NiMh, NiCd, Li Ion, or Li Polymer. The battery 1104 is charged by a charge circuit 1110 which receives power from either the first power input 1106 or the connector 1108. The charge circuit may comprise any of a number of available circuits. In the example shown in FIG. 2, control is provided to the CPU 1010 which may modify the charging behavior of the charge circuit 1110 based on information generated by the auxiliary processor 1024. In this example, the auxiliary processor 1024 monitors the battery via known interfaces, such as the SMART battery interface as specified by the Smart Battery System Implementers Forum.

A switch 1112 isolates the battery based upon the presence of power from the power input 1106 or connector 1108. Thus, when an external power supply is connected to either the power input 1106 or the connector 1108, the switch 112 is opened the battery is isolated from the power supplies 1102n and may be charged via the charge circuit 1110. Once power is removed from the power input 1106 and the connector 1108, the battery is connected to the power supplies 1102n.

A GPS system 1600 is connected to the auxiliary processor 1024, for example through a UART interface. The GPS system receives power from a power supply 1102a. The GPS system 1600 may comprise an uPATCH 100 from FASTRAX Ltd. It is believed that the combination of a PDT with a GPS, will impart benefits that may provide a significant return on investment for users of such systems. Such benefits include improved package tracking, providing navigation information to couriers; and PDT behavior modification based on location. In some cases, it may be desirable to have access to location and navigational data. Such data can either be created on an individual use case basis or bought from such sources as TeleAtlas. Geographic information systems (GIS), available from companies such as ESRIA, provide a development environment for the processing of GPS data and location/navigational data. In general, the data and methods associated with the use of a GPS system 1600, or a portion thereof, may be stored in any appropriate memory 1017n. It is not unusual for such databases to be provided in the form of removable FLASH memory modules.

A broader discussion of some of the benefits that may be obtained by the combination of PDT technology and GPS technology is incorporated in U.S. Provisional Application Ser. No. 60/757,217 entitled "Data Collection System Having Reconfigurable Data Collection Terminal", filed Jan. 5, 2006, assigned to the assignee of the present application and incorporated herein by reference.

During power savings modes, the CPU 1010 can be placed in a sleep state, while certain functions, such as those provided by the GPS system 1600, are controlled or monitored by the lower power consuming auxiliary processor 1024. Output of such functions may be buffered, for example in a memory associated with and under the control of the auxiliary processor 1024, until the CPU 1010 wakes and utilizes such output. To provide further power savings, the auxiliary processor 1024 may be provided with routines that place the GPS system 1600 into a sleep state when the output thereof is not necessary. The auxiliary processor 1024 may place the GPS system 1600 in a sleep state either through software commands to an internal power management function on the CiPS system 1600 or by opening a switch 1602.

The power consumption of any system in a sleep state may vary based on the system and sleep routines associated therewith. For example, a CPU may have a plurality of sleep states each of which has a different power profile and active functions. It is not unusual for a processor (be it central or otherwise) to have two sleep states: DEEP SLEEP and DEEPER SLEEP wherein certain functions such as DMA are available in the deep sleep mode but not in the deeper sleep mode. Accordingly, as used herein, the term sleep state will generally refer to a state in which one or more components or functions of a system or sub-subsystem are inactivated or limited in some manner so as to reduce power consumption.

In situations where the auxiliary processor 1024 is permitted to control the sleep state of the GPS system 1600, two basic modes of operation may prove beneficial: programmed or adaptive. In the programmed mode, the auxiliary processor 1024 wakes the GPS system 1600 from a sleep state at programmed time intervals, acquires and stores position data, then return the GPS system 1600 to sleep. In the adaptive algorithm mode, the auxiliary processor 1024 wakes the GPS system 1600 at a predetermined time, acquires and stores position data, then calculates a time (i.e. the next predetermined time) to next position based, for example, on current speed, terrain features, and/or a route histogram. Subsequently, the GPS system 1600 is placed in a sleep state to be awoken upon expiration of the calculated period of time. For example, where turn by turn directions would prove useful, the adaptive mode may be implemented wherein the current speed and direction could be used to calculate maximum sleep time between navigation critical way points. The auxiliary processor 1024 would only energize the GPS system 1600 when a navigation critical way point needed to be calculated, thus optimizing battery life without sacrificing navigational capabilities.

In either the programmed or adaptive mode, it may prove beneficial to place other components of the PDT 1000 (such as the CPU 1010, the LCD display 1020, the touch panel 1021, the auxiliary processor 1024, and any of the data acquisition systems 1028, 1020, and 1040) into a sleep state until a defined wake up condition is identified. The auxiliary processor 1024 would monitor GPS data and, upon identifying that a wake up condition exists, generate a wake up event for the CPU 1010. The auxiliary processor 1024 may take additional steps, such as transferring position data to the now-awake CPU 1010. Examples of events that could trigger a wake up include: a certain number of position fixes; a certain percentage of off-course position fixes; position matches on way points; and changes in position data relative to selected route information; etc. . . .

In some situations it may prove useful to keep the GPS system 1600 awake and active, for example wherein it is necessary to signal the approach of a way point. In this case, the CPU 1010 may be allowed to sleep while the auxiliary processor 1024 monitors the output of the GPS system 1600. When the auxiliary processor 1024 calculates a match (or near match) to the programmed way point (or perhaps a significant deviation from a way point), the CPU 100 may be woken to process the way point data as necessary.

Figure 4:
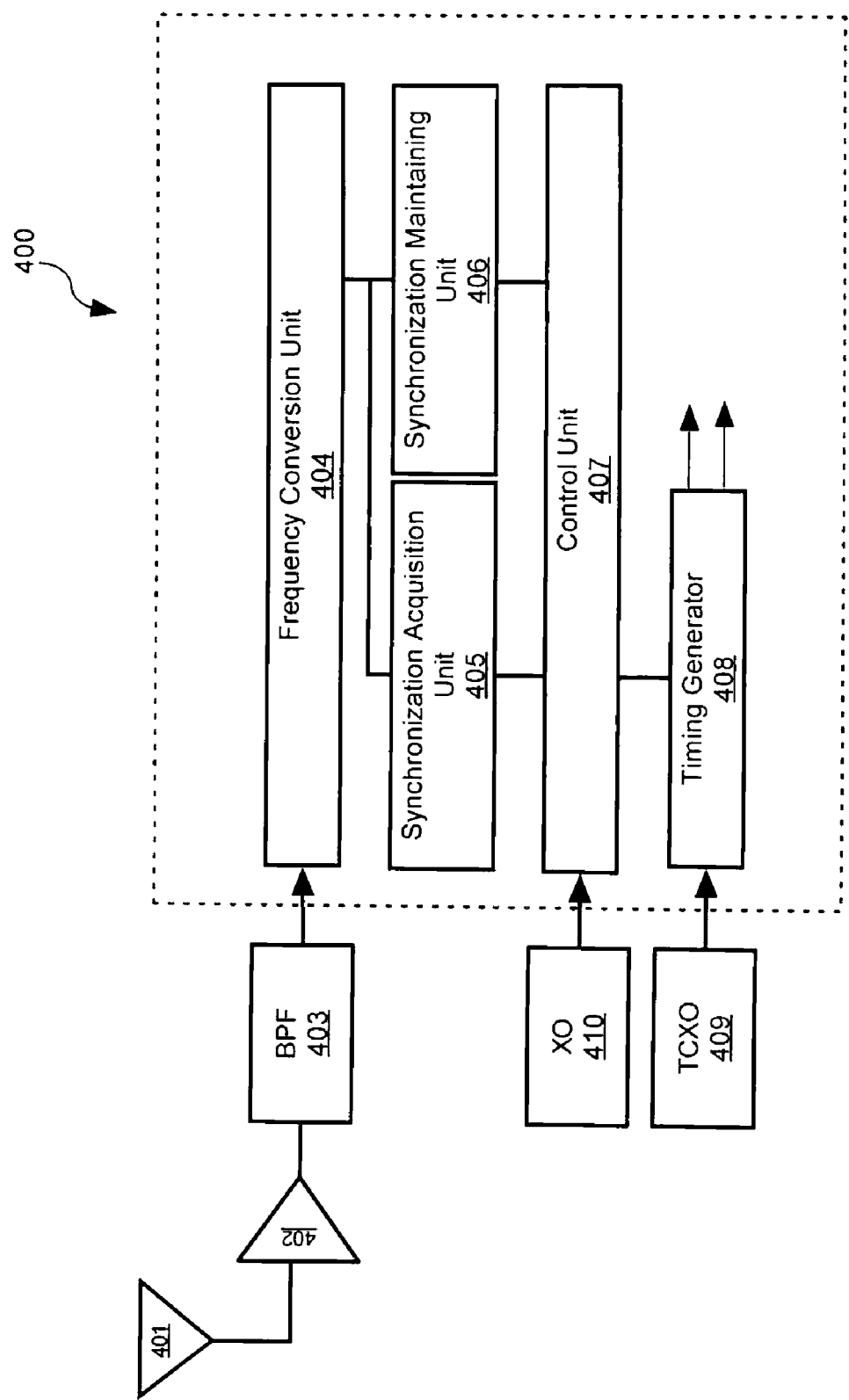
FIG. 4 is a block diagram of a GPS system suitable for use with present invention.

FIG. 4 is a block diagram of a GPS receiver 400 suitable for use with present invention. In general, any GPS receiver that outputs standard NMEA (National Marine Electronics Association) sentences (any version, including for example version 3.01) is suitable for use in the described examples of the present invention. NMEA sentences may include the complete PVT (position, velocity, time) solution as computed by the GPS receiver. While not as prevalent, other GPS data transfer standards are also suitable for use with the present invention.

The GPS receiver 400 and the following description thereof are only tangentially related to the present invention in that the present invention generally relates to methods of operating any of a number of industrially and commercially available GPS receiver structures. The following is nevertheless provided to for the purposes of providing a complete disclosure. FIG. 4 and the following description have been abstracted from U.S. Pat. No. 6,772,065, incorporated herein by reference. A more complete discussion of the structure illustrated in FIG. 4 may be found therein.

The GPS receiver 400 generally comprises an antenna 401, an amplifier 402, a BPF (Band Pass Filter) 403, a frequency conversion unit 404, a synchronization acquisition unit 405, a synchronization maintaining unit 406, a control unit 407, a timing generation unit 408 for generating a clock signal to be supplied to each unit, a crystal oscillator with a temperature compensating circuit (hereinafter, referred to as TCXO) 409. and a crystal oscillator 410 (represented by XO in FIG. 1).

A high frequency GPS signal from the GPS satellite is received by the antenna 401 and is supplied to the amplifier 402. The high frequency GPS signal comprises a signal transmitted from each satellite. It is obtained by Binary Phase Shift Keying (BPSK) modulating a carrier wave having a frequency of 1575.42 MHz using a signal (C/A code) obtained by spectrum diffusing transmission data of 50 bps using a PN code (diffusion code) having a pattern assigned to each GPS satellite in a transmission signal rate at 1.023 MHz and with a code length of 1023.

The amplifier 402 amplifies the high frequency GPS signal supplied thereto to a predetermined level and supplies it to the BPF 403. The BPF 403 removes unnecessary components from the high frequency GPS signal supplied thereto and supplies the high frequency GPS signal, of which unnecessary components have been removed, to the frequency conversion unit 404.

The frequency conversion unit 404 low-pass converts (down converts) the high frequency GPS signal supplied thereto into an intermediate frequency GPS signal as a signal at an intermediate frequency, forms the intermediate frequency data (hereinafter, referred to as the IF data) by analog/digital converting (binarization processing) this intermediate frequency GPS signal, and supplies the IF data to the synchronization acquisition unit 405 and the synchronization maintaining unit 406.

The synchronization acquisition unit 405 accumulates the IF data supplied thereto during a predetermined interval; performs the processing for acquiring the synchronization of the carrier frequency and the phase synchronization of the C/A code at a high speed with respect to this IF data: detects the C/A code phase, the carrier frequency, the correlation peak level and the satellite number; and supplies these to the control unit 407. The synchronization acquisition unit 405 may enable a plurality of PN codes to be generated in an exact timing enabling the acquisition of phase synchronization with the C/A code of the GPS signal from a plurality of GPS satellites at the same time.

The synchronization maintaining unit 406 generally includes a plurality of synchronization maintaining circuits so as to perform the processing with respect to the GPS signals from the different GPS satellites separately. Each of the synchronization acquisition circuits acquires a navigation message by demodulating the transmitted data provided by the GPS signal maintaining the synchronization to have this navigation message available by the control unit 407. The control unit 407 uses the navigation message, for example, from four synchronization maintenance circuits and obtains the position of this GPS receiver by means of the positioning operation.

Generally, the control unit 407 includes a CPU, memory (e.g. ROM and/or RAM), a time counter, and a Real Time Clock. The control unit 407 of the GPS receiver controls the synchronization acquisition unit 405 so as to acquire the synchronization of the carrier frequency of the received signal and the phase synchronization of the C/A code at a high speed. Then, on the basis of this acquisition result, the control unit 407 may control the synchronization maintaining unit 406, draw in the synchronization of the carrier frequency of the received signal and the phase synchronization of the C/A code at once to maintain them, acquire the bit data as the navigation message to perform the positioning operation, and accurately calculate the present position of this GPS receiver to output it via a host 10 terminal (not shown).

The timing generator 408 is provided with a fundamental frequency signal from the TCXO 9, then, the timing generator 408 multiplies/divides it to form a clock signal to be provided to each unit in the GPS receiver 400, such as the control unit 407, the synchronization acquisition unit 405, and the synchronization maintaining unit 406 so as to allow the target portion of each unit to operate.

Figure 5:
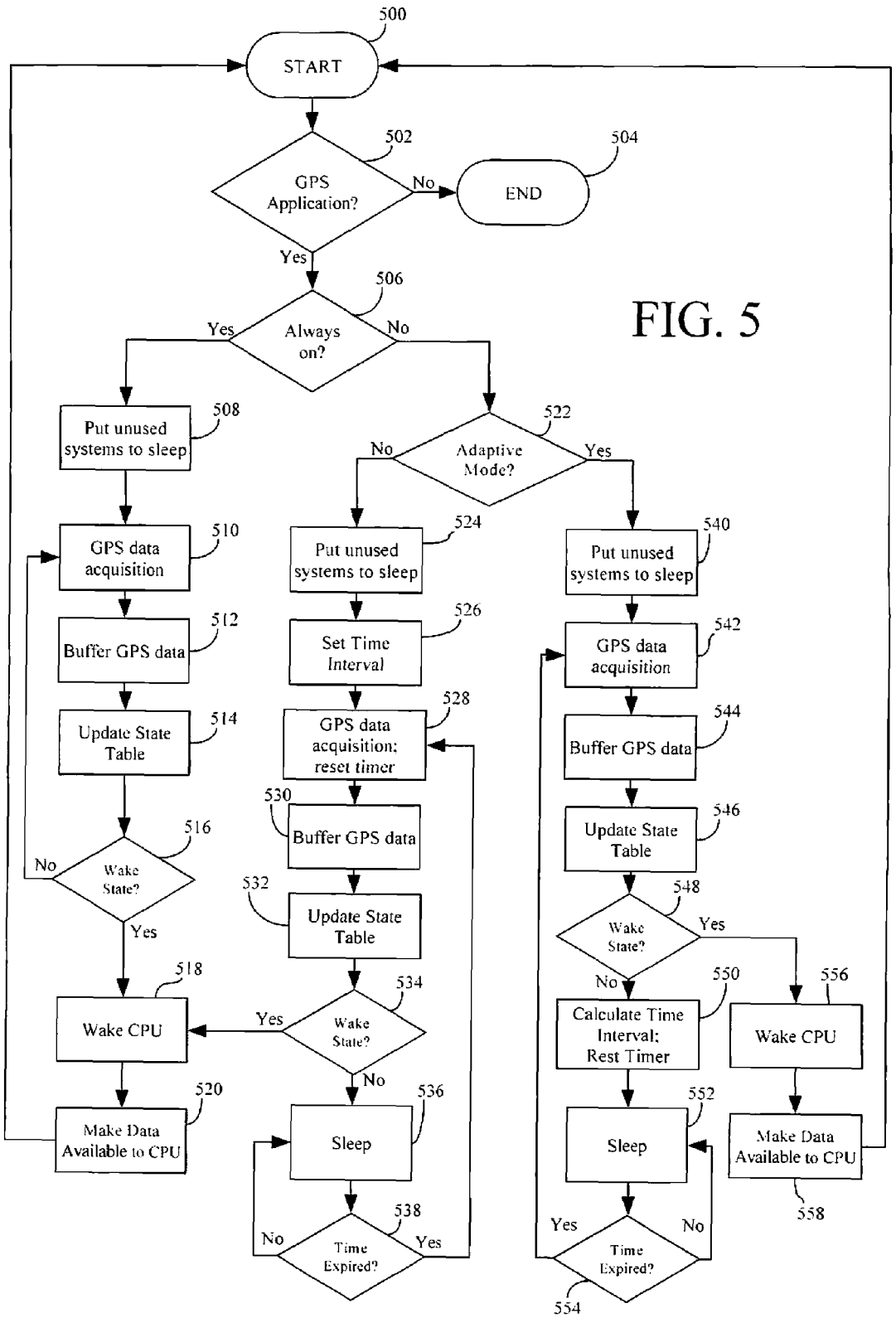
FIG. 5 is a flow chart of a method in accordance with an embodiment of the present invention.

FIG. 5 is a flow chart of a method in accordance with an embodiment of the present invention. The method starts in step 500. In step 502, a check is made as to whether GPS data acquisition and process is still desired. If not, the method ends in step 504. Other wise the method proceeds to step 506.

In step 506, a determination is made as to whether the GPS system may be put to sleep periodically to conserve power. In general, if constant monitoring of location is required, the GPS system should left ON all the time, e.g. awake or active. If the GPS system will stay ON (or active), the method proceeds to step 508. If, on the other hand, the GPS system may be put to sleep from time to time, the method will proceed to step 522.

In step 508, unused systems and sub-systems are put to sleep. Any system whose operation is either not needed or will not be needed until a certain state is identified based on location data may be put to sleep. Generally, but not always, this comprises putting at least the CPU to sleep. However other systems, such as the display (typically the most power intensive sub-system in a PDT), the touch screen, and any unused I/O systems may also be put to sleep. It may also prove advantageous to put the auxiliary processor to sleep. Next in step 510, GPS data acquisition is initiated and a NMEA data stream is output. Thereafter, in step 512, the NMEA data stream is buffered. In step 514, the NMEA data stream is analyzed. In the example illustrated in FIG. 5, this analysis comprises a state machine which updates a state table. The state machine may be implemented on an auxiliary processor, such as the auxiliary processor 1024 illustrated in FIG. 3. It is to be noted that some GPS sub-systems are provided with enough resources (such as FPGAs) to implement such calculations directly thereon. The determination as to where the state machine should be maintained is preferably (but not necessarily) made based on power consumption. In this manner, processing may performed using a relatively low power consumption device.

Next in step 516, the state table is checked to determine if a wake up state exists. A wake up state may be programmed to be any combination of factors based on the location data output from the GPS system. For example: the calculated location is within or outside of a preset distance of a specified location, a certain speed is calculated, a certain direction of travel (or combination thereof) is identified, a certain amount of time spent traveling at a certain speed is identified, a combination of a calculated location being within a preset distance and travel at a certain speed toward the location is identified, etc. . . . If a wake up state does not exist, the method returns to step 510 and GPS data acquisition is once again initiated. The interval between GPS data acquisitions may be determined by the selected GPS system, the facility with which the state machine is able to update the state table or some other external factors.

Once a wake state is identified in step 516, the method proceeds to step 518 and the CPU (and/or other subsystems) is woken. If the state machine is maintained on the GPS sub-system and the auxiliary processor was put into a sleep mode, the auxiliary processor may be woken first allowing a second level of decision making prior to waking the CPU. Thereafter, in step 520 data from or extracted from the GPS sub-system is made available to the CPU. For example, the memory location of the pertinent location data (and perhaps other output of the state machine) may be passed to the CPU for whatever processing is necessary, e.g. send warning to user, send a navigation instruction, wake other subsystems in expectation of user (or other) input, etc. . . . Thereafter, the method returns to step 500.

If in step 506, it was determined that the GPS system should be placed in a periodic sleep state, the method proceeded to step 522. In step 522, a determination is made as to whether an adaptive mode was desired. In a non-adaptive mode, the sleep period is fixed from period to period. In the adaptive mode, the GPS system (and potentially other systems and sub-systems) is put to sleep for a calculated time period which may be recalculated for each period.

If a non-adaptive mode is specified, the method proceeds to step 524 in which unused systems are put to sleep as in step 508. Next in step 526, a fixed time interval is specified (for example 0.005, 0.05, 0.5 seconds, 5 second, 5 minutes, etc. . .) depending on the desired granularity of the location data. Next in step 528, a timer is reset (either to 0, in the case of a count up timer, or to the value set in step 526, in the case of a count down timer) and GPS data acquisition is initiated. Thereafter, in step 530, the outputted NMEA data stream is buffered. In step 532, the NMEA data stream is analyzed. In the example illustrated in FIG. 5, this analysis comprises a state machine which updates a state table. The state machine may be implemented on an auxiliary processor, such as the auxiliary processor 1024 illustrated in FIG. 3, the GPS sub-system or any other capable sub-system. The determination as to where the state machine should be maintained is preferably (but not necessarily) made based on power consumption. In this manner, processing may performed using a relatively low power consumption device.

Next, in step 534, the state table is checked to determine if a wake up state exists. If a wake state exits, the method proceed to step 518 and the CPU (and/or other subsystems) is woken. The output (or a portion or interpretation thereof) of the GPS system is made available to the CPU. For example, the pertinent data may be passed directly to the CPU or the memory location of the pertinent location data (and perhaps other output of the state machine) may be passed to the CPU. The CPU can undertake any relevant processing of the data, e.g. send warning to user, send a navigation instruction, wake other subsystems in expectation of user (or other) input, etc. . . . Thereafter, the method returns to step 500.

If a wake state is not identified in step 534, the method proceeds to step 536 and the GPS system is put to sleep, e.g. it is powered down by, for example, the auxiliary processor 1024. Next in step 538, a determination is made as to whether the time interval set in step 526 has expired. Once the time interval has expired, the method goes to step 528 wherein another GPS data acquisition is initiated and the timer is reset.

If, in step 522, an adaptive mode is selected, the method proceeds to step 540 in which unused systems are put to sleep. Next in step 542 GPS data acquisition is initiated. Thereafter, in step 544, the outputted NMEA data stream is buffered. In step 546, the NMEA data stream is analyzed. In the example illustrated in FIG. 5, this analysis comprises a state machine which updates a state table. The state machine may be implemented on an auxiliary processor, such as the auxiliary processor 1024 illustrated in FIG. 3, the GPS sub-system or any other capable sub-system. The determination as to where the state machine should be maintained is preferably (but not necessarily) made based on power consumption. In this manner, processing may performed using a relatively low power consumption device.

Next, in step 548, the state table is checked to determine if a wake up state exists. If a wake state exits, the method proceed to step 556 and the CPU (and/or other subsystems) is woken. Next in step 558, the output (or a portion or interpretation thereof) of the GPS system is made available to the CPU. For example, the pertinent data may be passed directly to the CPU or the memory location of the pertinent location data (and perhaps other output of the state machine) may be passed to the CPU. The CPU can undertake any relevant processing of the data, e.g. send warning to user, send a navigation instruction, wake other subsystems in expectation of user (or other) input, etc. . . . Thereafter, the method returns to step 500.

If a wake state is not identified in step 548, the method proceeds to step 550 and a time interval is calculated for a subsequent sleep period. The time period may be calculated based upon a use to which the GPS data is to be put in conjunction with the one or more past data streams. The time period calculation may, for example, be based upon at least one of: current/past location data (e.g. a current location is within or outside of a preset distance of a specified location), a calculated speed, a direction of travel, an amount of time spent traveling at a certain speed or in a certain direction, a combination of a calculated location being within a preset distance and travel at a certain speed toward a specified location, time, date, etc. . . . For example, in a turn by turn application, the sleep period can be based upon the current distance from a next turn and the direction and speed of travel. In other words, an estimate is made as to when the vehicle will arrive at a location for which either a turn instruction or a warning of an imminent turn will be issued. A wake state may also be conditioned upon a series of occurrences, e.g. if a driver is correctly making his turns, the system stays asleep until the driver arrives at the specified location or makes a wrong turn.

Next in step 552 the GPS system is put to sleep, e.g. it is powered down by, for example, the auxiliary processor 1024. Next in step 554, a determination is made as to whether the time interval set in step 550 has expired. Once the time interval has expired, the method goes to step 542 wherein another GPS data acquisition is initiated and the timer is reset.

Although some embodiments of the present invention have been shown and described, it will be appreciated by those skilled in the art that changes may be made in these embodiments without departing from the principles and spirit of the invention, the scope of which is defined in the claims and their equivalents. For example, the forgoing description generally describes an embodiment where the auxiliary processor stays awake through out the entire method. This need not be the case; the auxiliary processor may be put into a sleep state and awoken based on a signal from the GPS unit. The signal may be generated when the GPS unit has data available.

What is claimed is:

1. A portable data terminal comprising:
    a central controller that has a sleep state wherein at least some of the functionality of the central controller may be limited to conserve power;
    a GPS system that outputs location data; and
    an auxiliary processor that operates using less power than the central controller when said central controller is fully activated, wherein during a power saving mode of operation the central controller operates with at least some functionality limited while the auxiliary processor monitors the output of the GPS system and signals the central controller to deactivate said sleep state based on the output of the GPS system.

2. A portable data terminal, as set forth in claim 1, further comprising a battery that supplies power to the central controller, GPS system, and auxiliary processor.

3. A portable data terminal, as set forth in claim 1, further comprising a data acquisition module that may be configured based upon location data output by the GPS system.

4. A portable data terminal, as set forth in claim 1, wherein the portable data terminal is sized to be held in a user's hand.

5. A portable data terminal, as set forth in claim 1, further comprising a water resistant housing supporting the central controller, GPS system, and auxiliary processor.

6. A portable data terminal, as set forth in claim 1, further comprising a data acquisition system.

7. A portable data terminal, as set forth in claim 1, wherein the auxiliary processor causes the GPS system to enter a sleep state, wherein at least some of the functionality of the GPS system is limited to conserve battery power when location data is not desired and wakes the GPS system when location data is desired.

8. A portable data terminal, as set forth in claim 7, wherein the auxiliary processor calculates a time period during which the GPS system may be placed in a sleep state and wakes the GPS system upon expiration of the time period.

9. A portable data terminal, as set forth in claim 8, wherein the time period is a fixed time period.

10. A portable data terminal, as set forth in claim 8, wherein the time period is calculated based on location data output by the GPS system.

11. A portable data terminal, as set forth in claim 10, wherein the time period is calculated based on a distance to a location.

12. A portable data terminal, as set forth in claim 11, wherein the time period decreases as the distance to a location decreases.

13. A portable data terminal, as set forth in claim 11, wherein the location is a way point.

14. A portable data terminal, as set forth in claim 8, wherein the time period is calculated based on a speed and direction of the portable data terminal.

15. A portable data terminal, as set forth in claim 8, wherein the time period is calculated based on a speed and direction of the portable data terminal and on proximity to a location.

16. A portable data terminal, as set forth in claim 8, wherein the time period is calculated based on location and route data.

17. A portable data terminal, as set forth in claim 1, wherein the auxiliary processor signals the central controller when the output of the GPS system indicates that portable data terminal is within a predetermined proximity to a location.

18. A portable data terminal, as set forth in claim 1, wherein the auxiliary processor signals the central controller when the output of the GPS system indicates that portable data terminal is outside a predetermined proximity to a location.

19. A portable data terminal, as set forth in claim 1, wherein the auxiliary processor signals the central controller when the output of the GPS system indicates that portable data terminal is exceeding a predetermined speed.

20. A portable data terminal, as set forth in claim 1, wherein the auxiliary processor signals the central controller when the output of the GPS system indicates that portable data terminal has been stationary for a predetermined time.

21. A portable data terminal, as set forth in claim 1, wherein the auxiliary processor signals the central controller when the output of the GPS system indicates that portable data terminal is approaching a predetermined intersection.

22. A portable data terminal, as set forth in claim 21, wherein the predetermined intersection is one at which the user should take a turn.

23. A portable data terminal, as set forth in claim 1, wherein the auxiliary processor signals the central controller when the output of the GPS system indicates that portable data terminal has taken an incorrect turn.

24. A method of controlling a portable data terminal, the method comprising:
    limiting the functionality of a central processing unit to reduce power consumption;
    calculating a time period during which functionality of a GPS system is limited to reduce power consumption;
    limiting the functionality of the GPS system during the calculated time period;
    monitoring the output of the GPS system to identify at least one predetermined state; and
    upon identification of a predetermined state restoring functionality to the central processing unit.

25. A method, as set forth in claim 24, wherein the time period is a fixed time period.

26. A method, as set forth in claim 24, wherein the time period is calculated based on location data output by the GPS system.

27. A method, as set forth in claim 26, wherein the time period is calculated based on a distance to a location.

28. A method, as set forth in claim 27, wherein the time period decreases as the distance to a location decreases.

29. A method, as set forth in claim 27, wherein the location is a way point.

30. A method, as set forth in claim 24, wherein the time period is calculated based on a speed and direction of the portable data terminal.

31. A method, as set forth in claim 24, wherein the time period is calculated based on a speed and direction of the portable data terminal and on proximity to a location.

32. A method, as set forth in claim 24, wherein the time period is calculated based on location and route data.

33. A method, as set forth in claim 24, wherein the predetermined state comprises the portable data terminal being within a predetermined proximity to a location.

34. A method, as set forth in claim 24, wherein the predetermined state comprises the portable data terminal being outside a predetermined proximity to a location.

35. A method, as set forth in claim 24, wherein the predetermined state comprises the portable data terminal exceeding a predetermined speed.

36. A method, as set forth in claim 24, wherein the predetermined state comprises the portable data terminal being stationary for a predetermined time.

37. A method, as set forth in claim 24, wherein the predetermined state comprises the portable data terminal approaching a predetermined intersection.

38. A method, as set forth in claim 37, wherein the predetermined intersection is one at which the user should take a turn.

39. A method, as set forth in claim 24, wherein the predetermined state comprises the portable data terminal taking an incorrect turn.

* * * * *

UNITED STATES PATENT AND TRADEMARK OFFICE
CERTIFICATE OF CORRECTION

PATENT NO. : 7,577,516 B2 Page 1 of 1
APPLICATION NO. : 11/382394
DATED : August 18, 2009
INVENTOR(S) : Dobeck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 75 days.

Signed and Sealed this

Seventh Day of September, 2010

David J. Kappos
*Director of the United States Patent and Trademark Office*